United States Patent Office 2,968,663
Patented Jan. 17, 1961

2,968,663

$\Delta^{1,4}$-PREGNADIENE-19,21-DIOL-3,20-DIONE AND ESTERS THEREOF

Alejandro Zaffaroni, Mexico City, Mexico, assignor to Syntex S.A., Mexico City, Mexico, a corporation of Mexico No Drawing. Original application Feb. 16, 1956, Ser. No. 565,783. Divided and this application Feb. 27, 1959, Ser. No. 799,397

Claims priority, application Mexico Feb. 25, 1955

2 Claims. (Cl. 260—397.47)

The present invention relates to novel cyclopentanophenanthrene derivatives and to a process for the production thereof. This application is a division of application Serial Number 565,783, filed February 16, 1956, now abandoned.

More particularly, the present invention relates to the production of the novel active cortical hormones $\Delta^{1,4}$-pregnadiene-11$\beta$,21-diol-3,20-dione and its esters, $\Delta^{1,4}$-pregnadiene-19,21-diol-3,20-dione and its esters, $\Delta^{1,4}$-pregnadiene-21-ol-3,11,20-trione and its esters, and $\Delta^{1,4}$-pregnadiene-11$\beta$,21-diol-18-al-3,20-dione and/or its hemiketal form. All of these compounds possess cortical hormone properties of the same type as the active cortical hormone corticosterone and/or its esters.

In accordance with the present invention it has been discovered that when $\Delta^{1,4}$-pregnadiene-21-ol-3,20-dione is incubated with adrenal gland material in a manner similar to that described in my U.S. Patent No. 2,671,752, there can be obtained by chromatography of the incubation product, $\Delta^{1,4}$-pregnadiene-11$\beta$,21-diol-3,20 - dione, $\Delta^{1,4}$-pregnadiene-19,21-diol-3,20-dione and $\Delta^{1,4}$-pregnadiene-11$\beta$,21-diol-18-al-3,20-dione. The first two mentioned free compounds may be transformed by conventional acylation procedures into their 21-esters, especially those of the type conventionally known and characterized as hydrocarbon carboxylic esters of less than about 10 carbon atoms.

Further, it has been discovered that oxidation of the 21-esters of $\Delta^{1,4}$-pregnadiene-11$\beta$,21-diol-3,20-dione with oxidizing agents for the 11-hydroxy group of steroids produces the corresponding ester of $\Delta^{1,4}$-pregnadiene-21-ol-3,11,20-trione readily saponified to the corresponding free alcohol.

The following equation serves to illustrate the present invention:

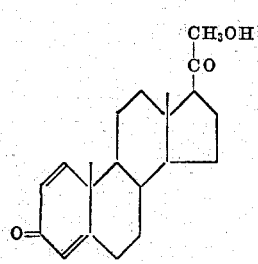

adrenal tissue incubation →

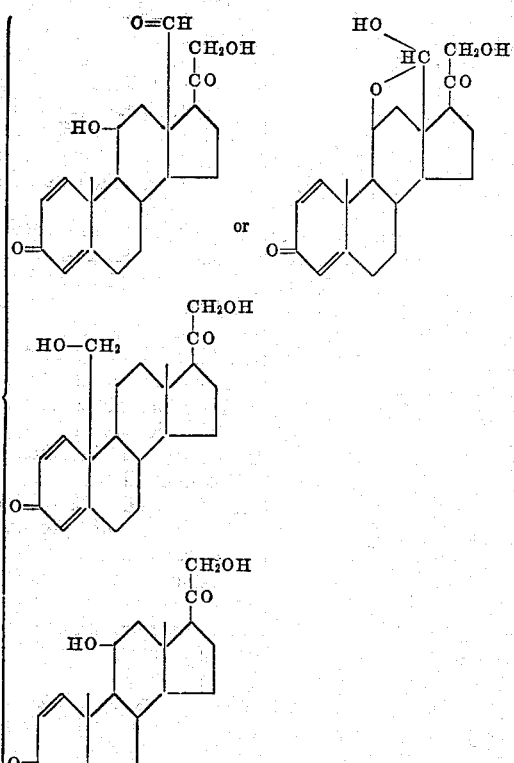

21-esterification followed by oxidation and saponification

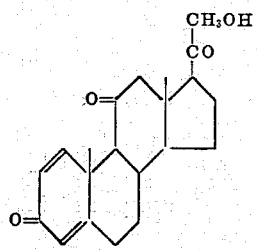

Referring to the above equation the starting compound $\Delta^{1,4}$-pregnadiene-21-ol-3,20-dione is prepared from the known acetate of allopregnane-21-ol-3,20-dione by dibromination to form a mixture of bromo compounds including the 2,4-dibromo derivatives and the 2,17-dibromo derivative. This mixture was then treated with collidine to form a mixture of unsaturated compounds from which the desired acetate of $\Delta^{1,4}$-pregnadiene-21-ol-3,20-dione was separated by chromatography. The acetate was then saponified to give the free $\Delta^{1,4}$-pregnadiene-21-ol-3,20-dione.

$\Delta^{1,4}$-pregnadiene-21-ol-3,20-dione was incubated in accordance with the conditions set forth in my aforementioned U.S. Patent No. 2,671,752, which briefly involves adding a solution of desoxycorticosterone to an incubation mixture of fresh, finely divided animal adrenal tissue and a physiological saline solution containing potassium and magnesium ions and a buffer capable of maintaining a pH of from 6.8 to 7.8. In addition, the saline solution contains a salt selected from the class consisting of alkali metal fumarates and citrates. The mixture is then incubated under agitation at a temperature of between 5° and 45° C. for at least one-half hour. As pointed out in the aforementioned patent, the adrenal tissue was preferably present in amount equal to from one part of tissue to one to five parts by volume of buffer solution, and the starting compound is preferably present in an amount approximately equal to one part of compound to a thousand parts of tissue, the alkali metal salt being present in amount equal to at least two and one-half mols to each 200 parts by weight of the buffer solution. After the incubation the reaction mixture is extracted with chloroform or other suitable solvent and using a column of silica, there is separated by chromatographic means mainly $\Delta^{1,4}$-pregnadiene-11$\beta$,21-diol-3,20-dione and smaller quantities of $\Delta^{1,4}$-pregnadiene-19,21-diol-3,20-dione and $\Delta^{1,4}$-pregnadiene-11$\beta$,21-18-al-3,20-dione. This last compound is believed to be present to some extent at least in the 11-hemiketal form as indicated in the foregoing equation.

Conventional acylation procedures transformed $\Delta^{1,4}$-pregnadiene-11,21-diol-3,20-dione into its 21-monoesters. By reaction with acyl anhydrides or acyl chlorides there were prepared the corresponding esters of hydrocarbon carboxylic acids such as propionates, butyrates, benzoates, cyclopentyl propionates, etc., all of these types of esters being known in the steroid art, and may be termed hydrocarbon carboxylic esters of less than 10 carbon atoms. Similarly, there was prepared the diesters of $\Delta^{1,4}$-pregnadiene-19,21-diol-3,20-dione, and of the 11-hemiketal form of $\Delta^{1,4}$-pregnadiene-11$\beta$,21,18-al-3,20-dione.

For the production of $\Delta^{1,4}$-pregnadiene-21-ol-3,11,20-trione, a corresponding 21-ester of $\Delta^{1,4}$-pregnadiene-11$\beta$,21-diol-3,20-dione such as the acetate was treated with an oxidizing agent capable of transforming the 11-hydroxy group into the 11-keto group, as for example chromic acid in acetic acid. The saponification preferably is performed at room temperature for a short period of time, as of the order of 10 minutes.

The resultant 21-ester of $\Delta^{1,4}$-pregnadiene-21-ol-3,11-trione is then subjected to mild saponification as for example with potassium bicarbonate in methanol to prepare the corresponding free $\Delta^{1,4}$-pregnadiene-21-ol-3,11,20-trione.

The following specific examples serve to illustrate but are not intended to limit the present invention:

EXAMPLE I

*Production of $\Delta^{1,4}$-pregnadiene-21-ol-3,20-dione*

10 g. of the acetate of allopregnane-21-ol-3,20-dione was dissolved in 300 cc. of C.P. acetic acid and treated dropwise under stirring with 9.7 g. of bromine (2.1 mols) in 100 cc. of acetic acid, at room temperature. The solution was kept standing for 4 hours, poured into water and the precipitate which consisted of a mixture of mono-, di- and tri-bromo derivatives, was collected and washed to neutral.

The brominated product obtained was refluxed for 1 hour with 50 cc. of collidine and the resulting mixture was distributed between chloroform and dilute hydrochloric acid, the organic layer was washed with much water, dried over sodium sulfate and evaporated to dryness. The residue was chromatographed in a column with washed alumina and the fractions eluted from the column which exhibited an ultraviolet absorption maximum at 244 m$\mu$ were combined and crystallized from acetone-hexane, thus giving 1.8 g. of the acetate of $\Delta^{1,4}$-pregnadiene-21-ol-3,20-dione with melting point of 203–204° C., $[\alpha]_D+123°$ (ethanol).

1 g. of this compound was dissolved in 150 cc. of methanol and mixed with 1.0 g. of sodium carbonate previously dissolved in 1 cc. of water. The mixture was heated for 15 minutes on the steam bath under an atmosphere of nitrogen and then diluted with water. The precipitate was crystallized from hexane-ethyl acetate to give the free $\Delta^{1,4}$-pregnadiene-21-ol-3,20-dione.

EXAMPLE II

The suprarenal glands of bovine or swine, recently slaughtered, are first ground in a meat grinder. 500 parts (by weight) of the ground glands thus obtained are stirred with 1,500 parts of a solution obtained by mixing 40 parts of a 4.5% solution of sodium chloride, 1.6 parts of a 5.75% solution of potassium chloride, 0.4 part of a 19.1% solution of magnesium sulfate heptahydrate, 20 parts of a buffer solution of 0.1 M monobasic sodium phosphate and dibasic sodium phosphate having a pH of 7.4, 30 parts of a 0.15 M solution of sodium fumarate (or sodium citrate) and 110 parts of water. The solution had a pH of around 7.4 and a temperature of 37° C. when mixing with the ground glands. One part was then added of $\Delta^{1,4}$-pregnadiene-21 - ol - 3,20 - dione previously dissolved in 30 parts of propylene glycol and the mixture was incubated for 4 hours at a temperature of 37° C. under strong stirring. After this time the reaction mixture was extracted with chloroform, using a centrifuge to achieve a clear separation of the layers. Chromatographic separation using a column of silica and hexane-ethyl acetate with increasing quantities of ethyl acetate afforded (in order of appearance) $\Delta^{1,4}$-pregnadiene-11$\beta$,21-diol-3,20-dione in 72% yield, $\Delta^{1,4}$-pregnadiene-11$\beta$,21-diol-18-al-3,20-dione in 1% yield and approximately 5% of $\Delta^{1,4}$-pregnadiene-19,21-diol-3,20-dione.

EXAMPLE III 1 g. of $\Delta^{1,4}$-pregnadiene-11$\beta$,21-diol-3,20-dione was dissolved in a mixture of 10 cc. of pyridine and 3 cc. of acetic anhydride and the mixture was kept for 8 hours at room temperature and then poured into water. The precipitate was collected, washed to neutral and crystallized from acetone-hexane, thus producing the 21-monoacetate of $\Delta^{1,4}$-pregnadiene-11$\beta$,21-diol-3,20-dione.

By similar procedures using other acyl anhydrides or chlorides there was prepared other corresponding 21-esters such as the propionate, butyrate and benzoate. Similarly there were prepared the diesters of $\Delta^{1,4}$-pregnadiene-19,21-diol-3,20-dione and of the 11-hemiketal form of $\Delta^{1,4}$-pregnadiene-11$\beta$,21-diol-18-al-3,20-dione.

1 g. of the monoacetate of $\Delta^{1,4}$-pregnadiene-11$\beta$,21-diol-3,20-dione was dissolved in 30 cc. of glacial acetic acid and slowly treated under stirring with a solution of 0.26 g. of chromic acid in 0.3 cc. of water and 3 cc. of acetic acid. The reaction mixture was kept for 10 minutes at a temperature of 20° C. and diluted with water. The precipitate was filtered and washed to neutral thus giving the acetate of $\Delta^{1,4}$-pregnadiene-21-ol-3,11,20-trione.

500 mg. of the acetate of $\Delta^{1,4}$-pregnadiene-21-ol-3,11,20-trione was dissolved in 30 cc. of methanol and mixed with a solution of 200 mg. of potassium bicarbonate in 1 cc. of water and the mixture was kept standing overnight under an atmosphere of nitrogen. Next morning it was diluted with water, the precipitate was filtered, washed to neutral and crystallized from methanol-water to give the free $\Delta^{1,4}$-pregnadiene-21-ol-3,11,21-trione.

I claim:

1. A new compound selected from the group consisting of $\Delta^{1,4}$-pregnadiene-19,21-diol-3,20-dione and the 19,21-diesters of hydrocarbon carboxylic acids of up to 10 carbon atoms thereof.

2. $\Delta^{1,4}$-pregnadiene-19,21-diol-3,20-dione.

References Cited in the file of this patent

UNITED STATES PATENTS

| | | |
|---|---|---|
| 2,778,776 | Wettstein et al. | Jan. 22, 1957 |
| 2,783,226 | Gould et al. | Feb. 26, 1957 |